United States Patent [19]

Aviv

[11] Patent Number: 5,666,157
[45] Date of Patent: Sep. 9, 1997

[54] ABNORMALITY DETECTION AND SURVEILLANCE SYSTEM

[75] Inventor: David G. Aviv, New York, N.Y.

[73] Assignee: ARC Incorporated, New York, N.Y.

[21] Appl. No.: 367,712

[22] Filed: Jan. 3, 1995

[51] Int. Cl.$^6$ .................................................. H04N 7/18
[52] U.S. Cl. .......................... 348/152; 348/150; 348/154; 348/155; 348/161
[58] Field of Search ............................... 348/143, 161, 348/150, 154, 155, 152; H04N 7/18

[56] References Cited

U.S. PATENT DOCUMENTS

| | | | |
|---|---|---|---|
| 4,337,482 | 6/1982 | Coutta | 348/150 |
| 4,737,847 | 4/1988 | Araki et al. | 348/161 |
| 5,091,780 | 2/1992 | Pomerleau | 348/152 |
| 5,097,328 | 3/1992 | Boyette | 348/150 |
| 5,283,644 | 2/1994 | Maeno | 348/152 |
| 5,512,942 | 4/1996 | Otsuki | 348/152 |
| 5,546,072 | 8/1996 | Creuseremee et al. | 348/143 |

*Primary Examiner*—Howard W. Britton
*Attorney, Agent, or Firm*—Darby & Darby

[57] ABSTRACT

A surveillance system having at least one primary video camera for translating real images of a zone into electronic video signals at a first level of resolution. The system includes means for sampling movements of an individual or individuals located within the zone from the video signal output from at least one video camera. Video signals of sampled movements of the individual is electronically compared with known characteristics of movements which are indicative of individuals having a criminal intent. The level of criminal intent of the individual or individuals is then determined and an appropriate alarm signal is produced.

4 Claims, 5 Drawing Sheets

ABNORMALITY DETECTION AND SURVEILLANCE SYSTEM

FIELD OF THE INVENTION

This invention generally relates to surveillance systems, and more particularly, to trainable surveillance systems which detect and respond to specific abnormal video and audio input signals.

BACKGROUND OF THE INVENTION

Today's surveillance systems vary in complexity, efficiency and accuracy. Earlier surveillance systems use several closed circuit cameras, each connected to a devoted monitor. This type of system works sufficiently well for low-coverage sites, i.e., areas requiring up to perhaps six cameras. In such a system, a single person could scan the six monitors, in "real" time, and effectively monitor the entire (albeit small) protected area, offering a relatively high level of readiness to respond to an abnormal act or situation observed within the protected area. In this simplest of surveillance systems, it is left to the discretion of security personnel to determine, first, if there is any abnormal event in progress within the protected area, second, the level of concern placed on that particular event, and third, what actions should be taken in response to the particular event. The reliability of the entire system depends on the alertness and efficiency of the worker observing the monitors.

Many surveillance systems, however, require the use of a greater number of cameras (e.g., more than six) to police a larger area, such as at least every room located within a large museum. To adequately ensure reliable and complete surveillance within the protected area, either more personnel must be employed to constantly watch the additionally required monitors (one per camera), or fewer monitors may be used on a simple rotation schedule wherein one monitor sequentially displays the output images of several cameras, displaying the images of each camera for perhaps a few seconds. In another prior art surveillance system (referred to as the "QUAD" system), four cameras are connected to a single monitor whose screen continuously and simultaneously displays the four different images. In a "quaded quad" prior art surveillance system, sixteen cameras are linked to a single monitor whose screen now displays, continuously and simultaneously all sixteen different images. These improvements flow fewer personnel to adequately supervise the monitors to cover the larger protected area.

These improvements, however, still require the constant attention of at least one person. The above described multiple-image/single screen systems suffered from poor resolution and complex viewing. The reliability of the entire system is still dependent on the alertness and efficiency of the security personnel watching the monitors. The personnel watching the monitors are still burdened with identifying an abnormal act or condition shown on one of the monitors, determining which camera, and which corresponding zone of the protected area is recording the abnormal event, determining the level of concern placed on the particular event, and finally, determining the appropriate actions that must be taken to respond to the particular event.

Eventually, it was recognized that human personnel could not reliably monitor the "real-time" images from one or several cameras for long "watch" periods of time. It is natural for any person to become bored while performing a monotonous task, such as staring at one or several monitors continuously, waiting for something unusual or abnormal to occur, something which may never occur.

As discussed above, it is the human link which lowers the overall reliability of the entire surveillance system. U.S. Pat. No. 4,737,847 issued to Araki et al. discloses an improved abnormality surveillance system wherein motion sensors are positioned within a protected area to first determine the presence of an object of interest, such as an intruder. In the system disclosed by U.S. Pat. No. 4,737,847, zones having prescribed "warning levels" are defined within the protected area. Depending on which of these zones an object or person is detected in, moves to, and the length of time the detected object or person remains in a particular zone determines whether the object or person entering the zone should be considered an abnormal event or a threat.

The surveillance system disclosed in U.S. Pat. No. 4,737,847 does remove some of the monitoring responsibility otherwise placed on human personnel; however, such a system can only determine an intruder's "intent" by his presence relative to particular zones. The actual movements and sounds of the intruder are not measured or observed. A skilled criminal could easily determine the warning levels of obvious zones within a protected area and act accordingly; spending little time in zones having a high warning level, for example.

It is therefore an object of the present invention to provide a surveillance system which overcomes the problems of the prior art.

It is another object of the invention to provide such a surveillance system wherein a potentially abnormal event is determined by a computer prior to summoning a human supervisor.

It is another object of the invention to provide a surveillance system which compares specific measured movements of a particular person or persons with a trainable, predetermined set of "typical" movements to determine the level and type of a criminal or mischievous event.

It is another object of this invention to provide a surveillance system which transmits the data from various sensors to a location where it can be recorded for evidentiary purposes. It is another object of this invention to provide such a surveillance system which is operational day and night.

It is another object of this invention to provide a surveillance system which can cull out real-time events which indicate criminal intent using a weapon, by resolving the low temperature of the weapon relative to the higher body temperature and by recognizing the stances taken by the person with the weapon.

It is yet another object of this invention to provide a surveillance system which eliminates or reduces the number of TV monitors and guards presently required to identify abnormal events, as this system will perform this function in near real time.

INCORPORATED BY REFERENCE

The content of the following references is hereby incorporated by reference.

1. Motz L. and L. Bergstein "Zoom Lens Systems", Journal of Optical Society of America, 3 papers in Vol. 52, 1992.

2. D. G. Aviv, "Sensor Software Assessment of Advanced Earth Resources Satellite Systems", ARC Inc. Report #70-80-A, pp. 2-107 through 2-119; NASA contract NAS-1-16366.

3. Shio, A. and J. Sklansky "Segmentation of People in Motion", Proc. of IEEE Workshop on Visual Motion, Princeton, N.J., October 1991.

4. Agarwal, R. and J Sklansky "Estimating Optical Flow from Clustered Trajectory Velocity Time".

5. Suzuki, S. and J Sklansky "Extracting Non-Rigid Moving Objects by Temporal Edges", IEEE, 1992, Transactions of Pattern Recognition.

6. Rabiner, L. and Biing-Hwang Juang "Fundamental of Speech Recognition", Pub. Prentice Hall, 1993, (p.434–495).

7. Weibel, A. and Kai-Fu Lee Eds. "Readings in Speech Recognition", Pub. Morgan Kaaufman, 1990 (p.267–296).

8. Rabiner L. "Application of Voice Processing to Telecommunication", Proc. IEEE, Vol. 82, No. 2, February, 1994.

SUMMARY OF THE INVENTION

A preferred embodiment of the herein disclosed invention involves a surveillance system having at least one primary video camera for translating real images of a zone into electronic video signals at a first level of resolution and means for sampling movements within the zone from the video camera output. These elements are combined with means for electronically comparing the sampled movements with known characteristics of movements which are indicative of individuals engaged in criminal activity and means for determining the level of such criminal activity. Associated therewith are means for activating at least one secondary sensor and associated recording device having a second higher level of resolution, said activating means being in response to determining a predetermined level of criminal activity.

DETAILED DESCRIPTION OF THE PREFERRED EMBODIMENTS

Figure 1:
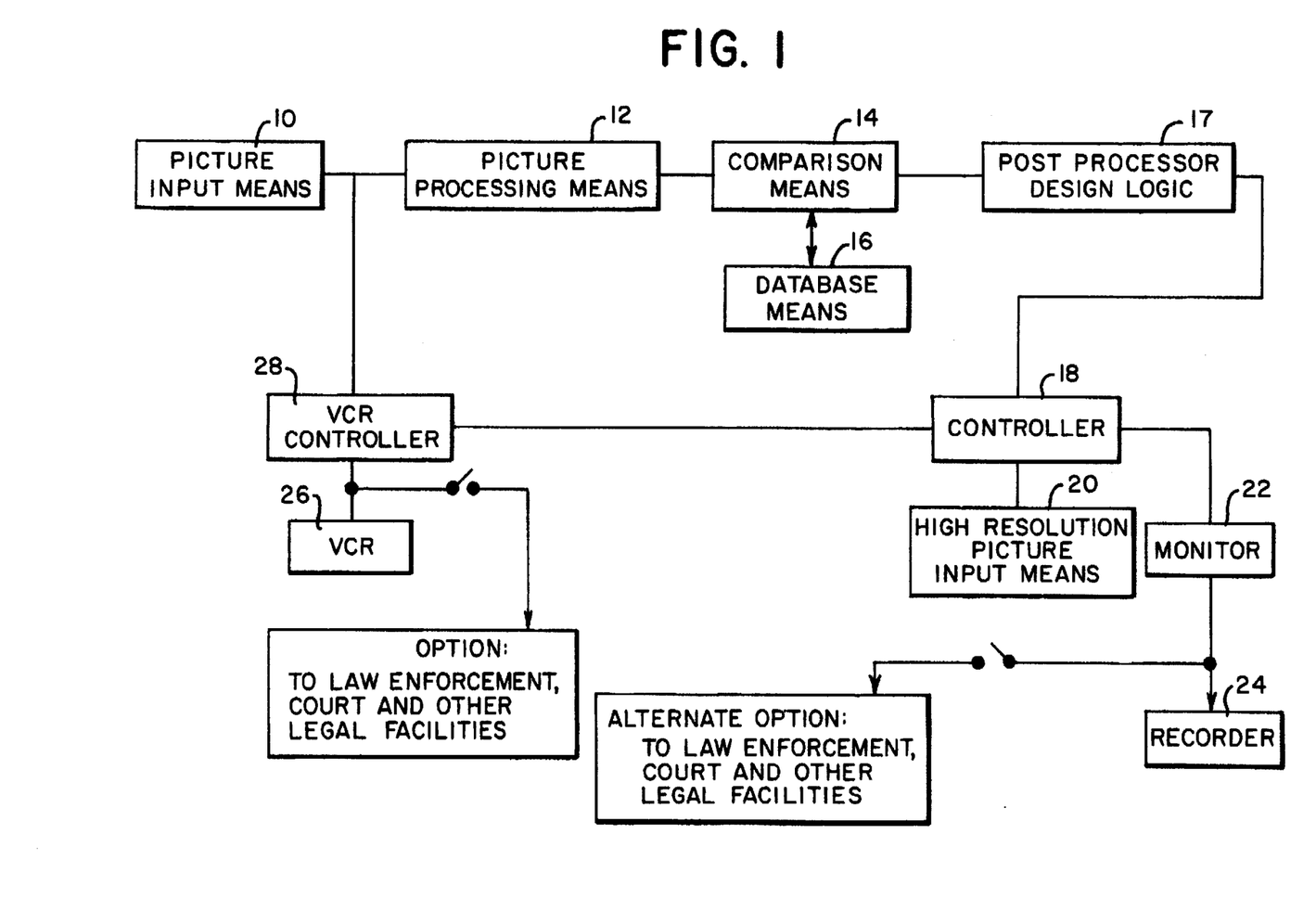
FIG. 1 is a schematic block diagram of the video, analysis, control, alarm and recording subsystems of an embodiment of this invention.

Referring to FIG. 1, the picture input means 10, may be any conventional electronic picture pickup device operational within the infrared or visual spectrum (or both) including a vidicon and a CCD/TV camera of moderate resolution, e.g., a camera about 1½ inches in length and about 1 inch in diameter, weighing about 3 ounces, including for particular deployment a zoom lens attachment. This device is intended to operate continuously and translate the field of view ("real") images within a first observation area into conventional video electronic signals.

Alternatively, a high rate camera/recorder, up to 300 frames/see (similar to those made by NAC Visual Systems of Woodland Hills, Calif., SONY and others) may be used as the picture input means 10. This would enable the detection of even the very rapid movement of body parts that are indicative of criminal intent, and their recording, as hereinbelow described. The more commonly used camera operates at 30 frames per second and cannot capture such quick body movement with sufficient resolution.

Picture input means 10, instead of operating continuously, may be activated by an "alert" signal from the processor of the low resolution camera or from the audio/word recognition processor when sensing a suspicious event.

Picture input means 10 contains a preprocessor which normalizes a wide range of illumination levels, especially for outside observation. The preprocessor emulates a vertebrate's retina, which has a an efficient and accurate normalization process. One such preprocessor (VLSI retina chip) is fabricated by the Carver Meade Laboratory of the California Institute of Technology in Pasadena, Calif. Use of this particular preprocessor chip will increase the automated vision capability of this invention whenever variation of light intensity and light reflection may otherwise weaken the picture resolution.

The signals from the picture input means 10 are converted into digitized signals and then sent to the picture processing means 12. The processor means controlling each group of cameras will be governed by an artificial intelligence system, based on dynamic pattern recognition principles, as further described below. Picture processing means 12 includes an image raster analyzer which effectively segments each image to isolate each pair of people. The image raster analyzer subsystem of picture processing means 12 segments each sampled image to identify and isolate each pair of objects (or people), and each "two on one" group of three people separately.

The "two on one" grouping represents a common mugging situation in which two individuals approach a victim, one from in front of the victim and the other from behind. The forward mugger tells the potential victim that if he does not give up his money, (or watch, ring, etc.) the second mugger will shoot him, stab or otherwise harm him. The group of three people will thus be considered a potential crime in progress and will therefore be segmented and analyzed in picture processing means.

With respect to a zoom lens system useful as an element in the picture input means 10, the essentials of the zoom lens subsystem are described in three papers written by L. Motz and L. Bergstein, in an article titled "Zoom Lens Systems" in the Journal of Optical Society of America, Vol. 52, April, 1992. This article is hereby incorporated by reference.

The essence of the zoom system is to vary the focal length such that an object being observed will be focused and magnified at its image plane. In an automatic version of the zoom system, once an object is in the camera's field-of-view (FOV), the lens moves to focus the object onto the camera's image plane. An error signal which is used to correct the focus by the image planes is generated by a CCD array into two halves and measuring the difference, segmenting in each until the object is at the center. Dividing the CCD array into more than two segments, say four quadrants, is a way to achieve automatic centering, as is the case with mono-pulse radar. Regardless of the number of segments, the error signal is used to generate the desired tracking of the object.

In a wide field-of-view (WFOV) operation, there may be more than one object, thus special attention is given to the design of the zoom system and its associated software and firmware control. Assuming three objects, as is the "two on one" potential mugging threat described above, and that the three persons are all in one plane, one can program a shifting from one object to the next, from one face to another face, in a prescribed sequential order. Moreover, as the objects move within the WFOV they will be automatically tracked in azimuth and elevation. In principle, the zoom would focus on the nearest object, assuming that the mount of light on each object is the same so that the prescribed sequence starting from the closes object will proceed to the remaining objects from, for example, right to left.

However, when the three objects are located in different planes, but still within the camera's WFOV, the zoom, with input from the segmentation subsystem of the picture analysis means 12 will focus on the object closest to the right hand side of the image plane, and then proceed to move the focus to the left, focusing on the next object and on the next sequentially.

In all of the above cases, the automatic zoom can more naturally choose to home-in on the person with the brightest emission or reflection, and then proceed to the next brightness and so forth. This would be a form of an intensity/time selection multiplex zoom system.

The relative positioning of the input camera with respect to the area under surveillance will effect the accuracy by which the image raster analyzer segments each image. In this preferred embodiment, it is beneficial for the input camera to view the area under surveillance from a point located directly above, e.g., with the input camera mounted high on a wall, a utility tower, or a traffic light support tower. The height of the input camera is preferably sufficient to minimize occlusion between the input camera and the movement of the individuals under surveillance.

Once the objects within each sampled video frame are segmented (i.e., detected and isolated), an analysis is made of the detailed movements of each object located within each particular segment of each image, and their relative movements with respect to the other objects.

Each image frame segment, once digitized, is stored in a frame by frame memory storage of picture processing means 12. Each frame from the picture input means 10 is subtracted from a previous frame already stored in processing means 12 using any conventional differencing process. The differencing process involving multiple differencing steps takes place in the processing section 12. The resulting difference signal (outputted from the differencing sub-section of means 12) of each image indicates all the changes that have occurred from one frame to the next. These changes include any movements of the individuals located within the segment and any movements of their limbs, e.g., arms.

Referring to FIG. 3, a collection of differencing signals for each moved object of subsequent sampled frames of images (called a "track") allows a determination of the type, speed and direction (vector) of each motion involved, processing which will extract acceleration, i.e., note of change of velocity: and change in acceleration with respect to time (called "jerkiness"), and correlating this with stored signatures of known physical criminal acts. For example, subsequent differencing signals may reveal that an individual's arm is moving to a high position, such as the upper limit of that arm's motion, i.e., above his head) at a fast speed. This particular movement could be perceived, as described below, as a hostile movement with a possible criminal activity requiring the expert analysis of security personnel.

The intersection of two tracks indicates the intersection of two moved objects. The intersecting objects, in this case, could be merely the two hands of two people greeting each other, or depending on other characteristics, as described below, the intersecting objects could be interpreted as a fist of an assailant contacting the face of a victim in a less friendly greeting. In any event, the intersection of two tracks immediately requires further analysis and/or the summoning of security personnel. But the generation of an alarm, fight and sound devices located, for example, on a monitor will turn a guard's attention only to that monitor, hence the labor savings. In general however, friendly interactions between individuals is a much slower physical process than is a physical assault vis-a-vis body parts of the individuals involved. Hence, friendly interactions may be easily distinguished from hostile physical acts using current low pass and high pass filters, and current pattern recognition techniques based on experimental reference data.

When a large number of sensors (called a sensor suite) are distributed over a large number of facilities, for example, a number of ATMs (automatic teller machines), associated with particular bank branches and in a particular state or states and all operated under a single bank network control, then only one monitor is required.

A commercially available software tool may enhance object-movement analysis between frames (called optical flow computation). With optical flow computation, specific (usually bright) reflective elements, called farkles, emitted from the clothing and/or the body parts of an individual of one frame are subtracted from a previous frame. The bright portions will inherently provide sharper detail and therefore will yield more accurate data regarding the velocities of the relative moving objects. Additional computation, as described below, will provide data regarding the acceleration and even change in acceleration or "jerkiness" of each moving part sampled.

The physical motions of the individuals involved in an interaction, will be detected by first determining the edges of the of each person imaged. And the movements of the body parts will then be observed by noting the movements of the edges of the body parts of the individuals involved in the interaction. The differencing process will enable the determination of the velocity and acceleration and rate of acceleration of those body parts.

The now processed signal is sent to comparison means 14 which compares selected flames of the video signals from the picture input means 10 with "signature" video signals stored in memory 16. The signature signals are representative of various positions and movements of the body ports of an individual having various levels of criminal intent. The method for obtaining the data base of these signature video signals in accordance with another aspect of the invention is described in greater detail below.

If a comparison is made positive with one or more of the signature video signals, an output "alert" signal is sent from the comparison means 14 to a controller 18. The controller 18 controls the operation of a secondary, high resolution picture input means (video camera) 20 and a conventional monitor 22 and video recorder 24. The field of view of the secondary camera 20 is preferably at most, the same as the field of view of the primary camera 10, surveying a second observation area. The recorder 24 may be located at the site and/or at both a law enforcement facility (not shown) and simultaneously at a court office or legal facility to prevent loss of incriminating information due to tampering.

The purpose of the secondary camera 20 is to provide a detailed video signal of the individual having assumed criminal intent and also to improve false positive and false negative performance. This information is recorded by the video recorder 24 and displayed on a monitor 22. An alarm bell or light (not shown) or both may be provided and activated by an output signal from the controller 20 to summon a supervisor to immediately view the pertinent video images showing the apparent crime in progress and access its accuracy.

In still another embodiment of the invention, a VCR 26 is operating continuously (using a 6 hour loop-tape, for example). The VCR 26 is being controlled by the VCR controller 28. All the "real-time" images directly from the picture input means 10 are immediately recorded and stored for at least 6 hours, for example. Should it be determined that a crime is in progress, a signal from the controller 18 is sent to the VCR controller 28 changing the mode of recording from tape looping mode to non-looping mode. Once the VCR 26 is changed to a non-looping mode, the tape will not re-loop and will therefore retain the perhaps vital recorded video information of the surveyed site, including the crime itself, and the events leading up to the crime.

When the non-looping mode is initiated, the video signal may also be transmitted to a VCR located elsewhere; for example, at a law enforcement facility and, simultaneously to other secure locations of the Court and its associated offices.

Prior to the video signals being compared with the "signature" signals stored in memory, each sampled frame of video is "segmented" into parts relating to the objects detected therein. To segment a video signal, the video signal derived from the vidicon or CCD/TV camera is analyzed by an image raster analyzer. Although this process causes slight signal delays, it is accomplished nearly in real time.

At certain sites, or in certain situations, a high resolution camera may not be required or otherwise used. For example, the resolution provided by a relatively simple and low cost camera may be sufficient. Depending on the level of security for the particular location being surveyed, and the time of day, the length of frame intervals between analyzed frames may vary. For example, in a high risk area, every frame from the CCD/TV camera may be analyzed continuously to ensure that the maximum amount of information is recorded prior to and during a crime. In a low risk area, it may be preferred to sample perhaps every 10 frames from each camera, sequentially.

If, during such a sampling, it is determined that an abnormal or suspicious event is occurring, such as two people moving very close to each other, then the system would activate an alert mode wherein the system becomes "concerned and curious" in the suspicious actions and the sampling rate is increased to perhaps every 5 frames or even every frame. As described in greater detail below, depending on the type of system employed (i.e., video only, audio only or both), during such an alert mode, the entire system may be activated wherein both audio and video system begin to sample the environment for sufficient information to determine the intent of the actions.

Referring to FIG. 2, several frames of a particular camera output are shown to illustrate the segmentation process performed in accordance with the invention. The system begins to sample at frame K and determines that there are four objects (previously determined to be people, as described below), A-D located within a particular zone being policed. Since nothing unusual is determined from the initial analysis, the system does not warrant an "alert" status. People A, B, and D are moving according to normal, non-criminal intent, as could be observed.

Figure 2A:
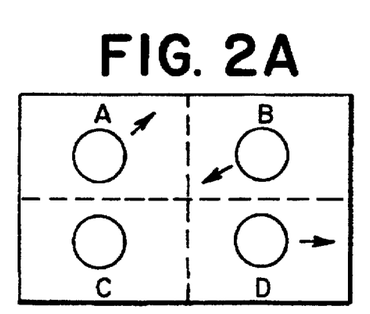
FIG. 2A illustrates a frame K of a video camera's output of a particular environment, according to the invention, showing four representative objects (people) A, B, C, and D, wherein objects A, B and D are moving in a direction indicated with arrows, and object C is not moving.
Figure 2B:
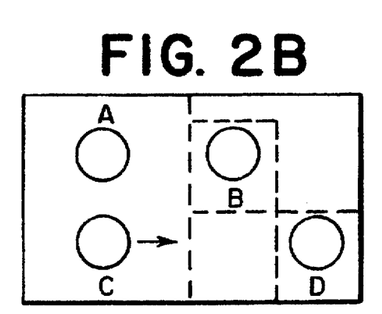
FIG. 2B illustrates a frame K+5 of the video camera's output, according to the invention, showing objects A, B, and D are stationary, and object C is moving.
Figure 2C:
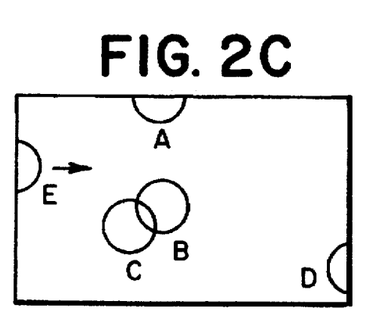
FIG. 2C illustrates a frame K+10 of the video camera's output, according to the invention, showing the current location of object A, B, C, D, and E.
Figure 2D:
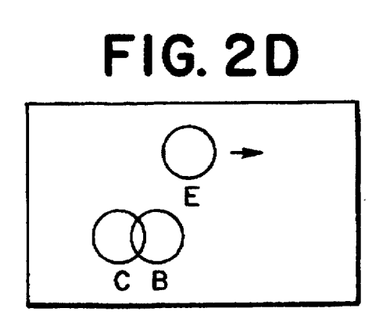
FIG. 2D illustrates a frame K+11 of the video camera's output, according to the invention, showing object B next to object C, and object E moving to the right.
Figure 2E:
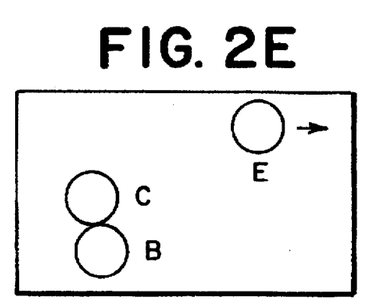
FIG. 2E illustrates a frame K+12 of the video camera's output, according to the invention, showing a potential crime taking place between objects B and C.
Figure 2F:
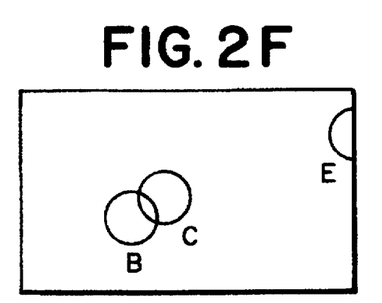
FIG. 2F illustrates a frame K+13 of the video camera's output, according to the invention, showing objects B and C interacting.

A crime likelihood is indicated when frames K+10 through K+13 are analyzed by the differencing process. And if the movement of the body parts indicate velocity, acceleration and "jerkiness" that compare positively with the stored digital signals depicting movements of known criminal physical assaults, it is likely that a crime is in progress here.

Figure 2G:
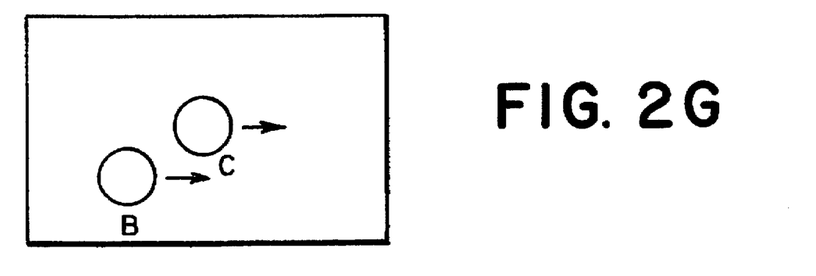
FIG. 2G illustrates a frame K+15 of the video camera's output, according to the invention, showing object C moving the right and object B following.
Figure 2H:
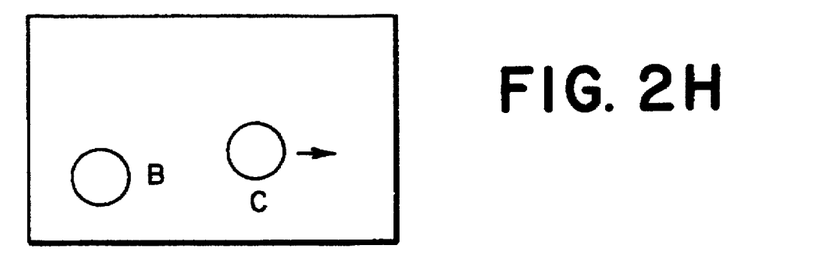
FIG. 2H illustrates a frame K+16 of the video camera's output, according to the invention, showing object C moving away from a stationary object B.
Figure 2I:
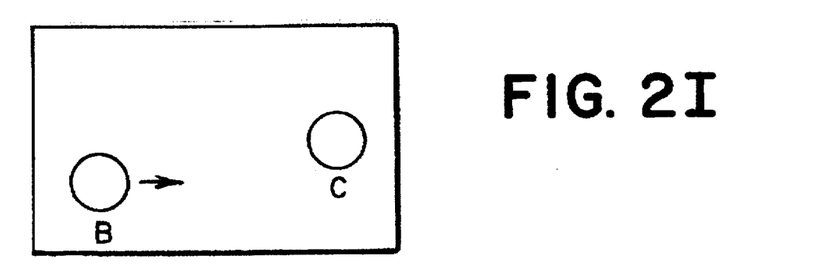
FIG. 2I illustrates a frame K+17 of the video camera's output, according to the invention, showing object B moving towards object C.
Figure 3A:
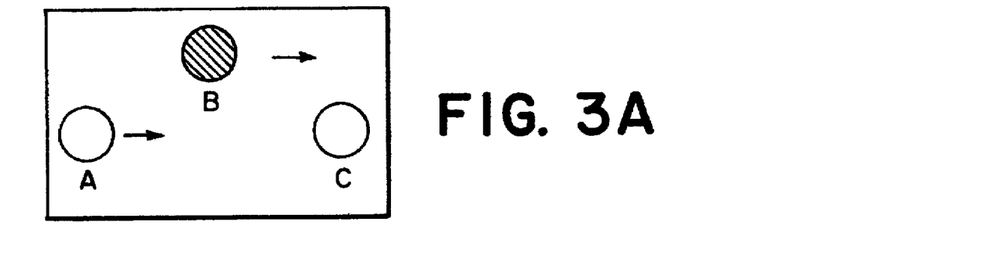
FIG. 3A illustrates a frame of a video camera's output, according to the invention, showing a "two on one" interaction of objects (people) A, B, and C.
Figure 3B:
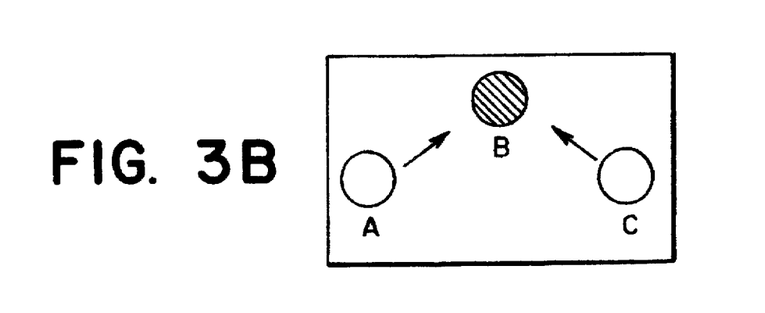
FIG. 3B illustrates a later frame of the video camera's output of FIG. 3A, according to the invention, showing objects A and C moving towards object B.
Figure 3C:
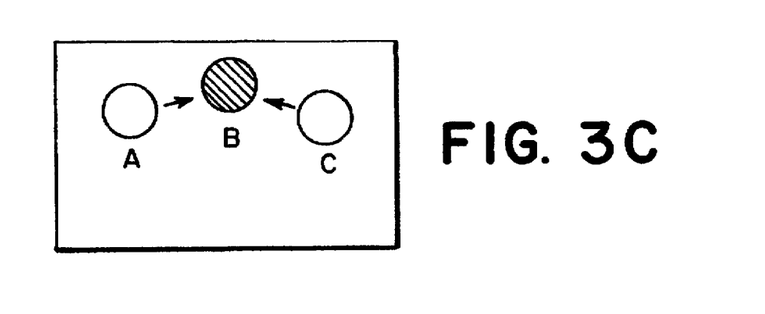
FIG. 3C illustrates a later frame of the video camera's output of FIG. 3B, according to the invention, showing objects A and C moving in close proximity to object B.
Figure 3D:
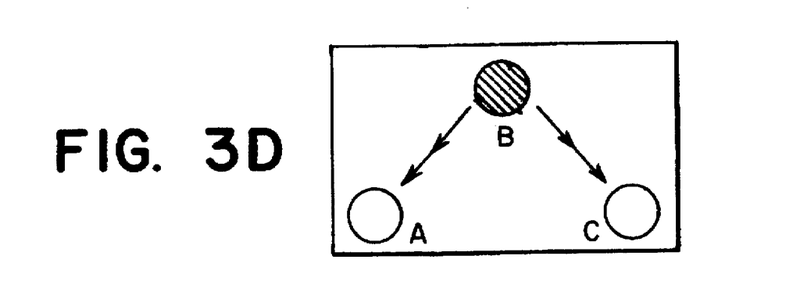
FIG. 3D illustrates a later frame of the video camera's output of FIG. 3C, according to the invention, showing objects A and C quickly moving away from object B.

Additionally, if a high velocity of departure is indicated when person C moves away from person B, as indicated in frames K+15 through K+17, a larger level of confidence, is attained in deciding that a physical criminal act has taken place or is about to.

An alarm is generated the instant any of the above conditions is established. This alarm condition will result in sending in Police or Guards to the crime site, activating the high resolution CCD/TV camera to record the face of the person committing the assault, a loud speaker being activated automatically, playing a recorded announcement warning the perpetrator the seriousness of his actions now being undertaken and demanding that he cease the criminal act. After dark a strong light will be turned on automatically. The automated responses will be actuated the instant an alarm condition is determined by the processor. Furthermore, an alarm signal is sent to the police station, and the same video signal of the event is transmitted to a court appointed data collection office, to the Public Defender's office and the District Attorney's Office.

As described above, it is necessary to compare the resulting signature of physical body parts motion involved in a physical criminal act, that is expressed by specific motion characteristics (i.e., velocity, acceleration, change of acceleration), with a set of signature files of physical criminal acts, in which body parts motion are equally involved. This comparison, is commonly referred to as pattern matching and is part of the pattern recognition process.

Files of physical criminal acts, which involve body parts movements such as hands, arms, elbows, shoulder, head, torso, legs, and feet, can be reviewed to ascertain this pattern. In addition, a priority can be set by experiments and simulations of physical criminal acts gathered from "dramas" that are enacted by professional actors, the data gathered from experienced muggers who have been caught by the police as well as victims who have reported details of their experiences will help the actors perform accurately. Video of their motions involved in these simulated acts can be stored in digitized form and files prepared for signature motion of each of the body parts involved, in the simulated physical criminal acts.

In another embodiment, the above described Abnormality Detection System includes an RF-ID (Radio Frequency Identification) tag or card to assist in the detection and tracking of individuals within the field of view of a camera. Such cards or tags could be used by authorized individuals to respond when queried by the RF interrogator. The response signal of the tags propagation pattern which is adequately registered with the video sensor. The card or tag, when sensed in video, would be assumed friendly and authorized. This information would simplify the segmentation process.

A light connected to each RF-ID card will be turned ON, when a positive response to an interrogation signal is established. The light will appear on the computer generated grid (also on the screen of the monitor) and the intersection of tracks clearly indicated, followed by their physical interaction. But also noted will be the intersection between the tagged and the untagged individuals. In all of such cases, the segmentation process will be simpler.

There are many manufacturers of RF-ID cards and Interrogators, three major ones are, The David Sarnoff Research Center of Princeton, N.J., AMTECH of Dallas, Tex. and MICRON Technology of Boise, Id.

The applications of the present invention include banks, ATMs, hotels, schools, residence halls and dormitories, office and residential buildings, hospitals, sidewalks, street crossings, parks, containers and container loading areas, shipping piers, train stations, truck loading stations, airport passenger and freight facilities, bus stations, subway stations, theaters, concert halls, sport arenas, libraries, churches, museums, stores, shopping malls, restaurants, convenience stores, bars, coffee shops gasoline stations, highway rest stops, tunnels, bridges, gateways, sections of highways, toll booths, warehouses, and depots, factories and assembly rooms, law enforcement facilities including jails. Any location or facility, civilian or military, requiring security would be a likely application.

Further applications of this invention are in moving platforms: automobiles, trucks, buses, subway cars, train cars, both freight and passenger, boats, ships (passenger and freight), tankers, service and construction vehicles, on and off-road, containers and their carriers, and airplanes, and also in equivalent military and sensitive mobile platforms.

As a deterrence to car-jacking a tiny CCD/TV camera hidden in the ceiling or the rearview mirror of the car, and focussed through a pin hole lens to the driver's seat, may be connected to the video processor to record the face of the drive. The camera is triggered by the automatic word recognition processor that will identify the well known expressions commonly used by the car-jacker. The video picture will be recorded and then transmitted via cellular phone in the car. Without a phone, the short video recording of the face of the car-jacker will be held until the car is found by the police, but now with the evidence (the picture of the car-jacker) in hand.

In this present surveillance system, the security personnel manning the monitors are alerted only to video images which show suspicious actions (criminal activities) within a prescribed observation zone. The security personnel are therefore used to access the accuracy of the crime and determine the necessary actions for an appropriate response. By using computers to effectively filter out all normal and noncriminal video signals from observation areas, fewer security personnel are required to survey and "secure" a greater overall area (including a greater number of observation areas, i.e., cameras).

It is also contemplated that the present system could be applied to assist blind people "see". A battery operated portable version of the video system would automatically identify known objects in its field of view and a speech synthesizer would "say" the object. For example, "chair", "table", etc. would indicate the presence of a chair and a table.

Depending on the area to be policed, it is preferable that at least two and perhaps three cameras (or video sensors) are used simultaneously to cover the area. Should one camera sense a first level of criminal action, the other two could be manipulated to provide a three dimensional perspective coverage of the action. The three dimensional image of a physical interaction in the policed area would allow observation of a greater number of details associated with the steps: accost, threat, assault, response and post response. The conversion process from the two dimensional image to the three dimensional image is achieved by use of the known Radon transform.

In the extended operation phase of the invention as more details of the physical variation of movement characteristics of physical threats and assaults against a victim and also the speaker independent (male, female of different ages groups) and dialect independent words and terse sentences, with corresponding responses, will enable automatic recognition of a criminal assault, without he need of guard, unless required by statutes and other external requirements.

In another embodiment of the present invention, both video and acoustic information is sampled and analyzed. The acoustic information is sampled and analyzed in a similar manner to the sampling and analyzing of the above-described video information. The audio information is sampled and analyzed in a manner shown in FIG. 4, and is based on prior art.

The employment of the audio speech band, with its associated Automatic Speech Recognition (ASR) system, will not only reduce the false alarm rate resulting from the video analysis, but can also be used to trigger the video and other sensors if the sound threat predates the observed threat.

Figure 4:
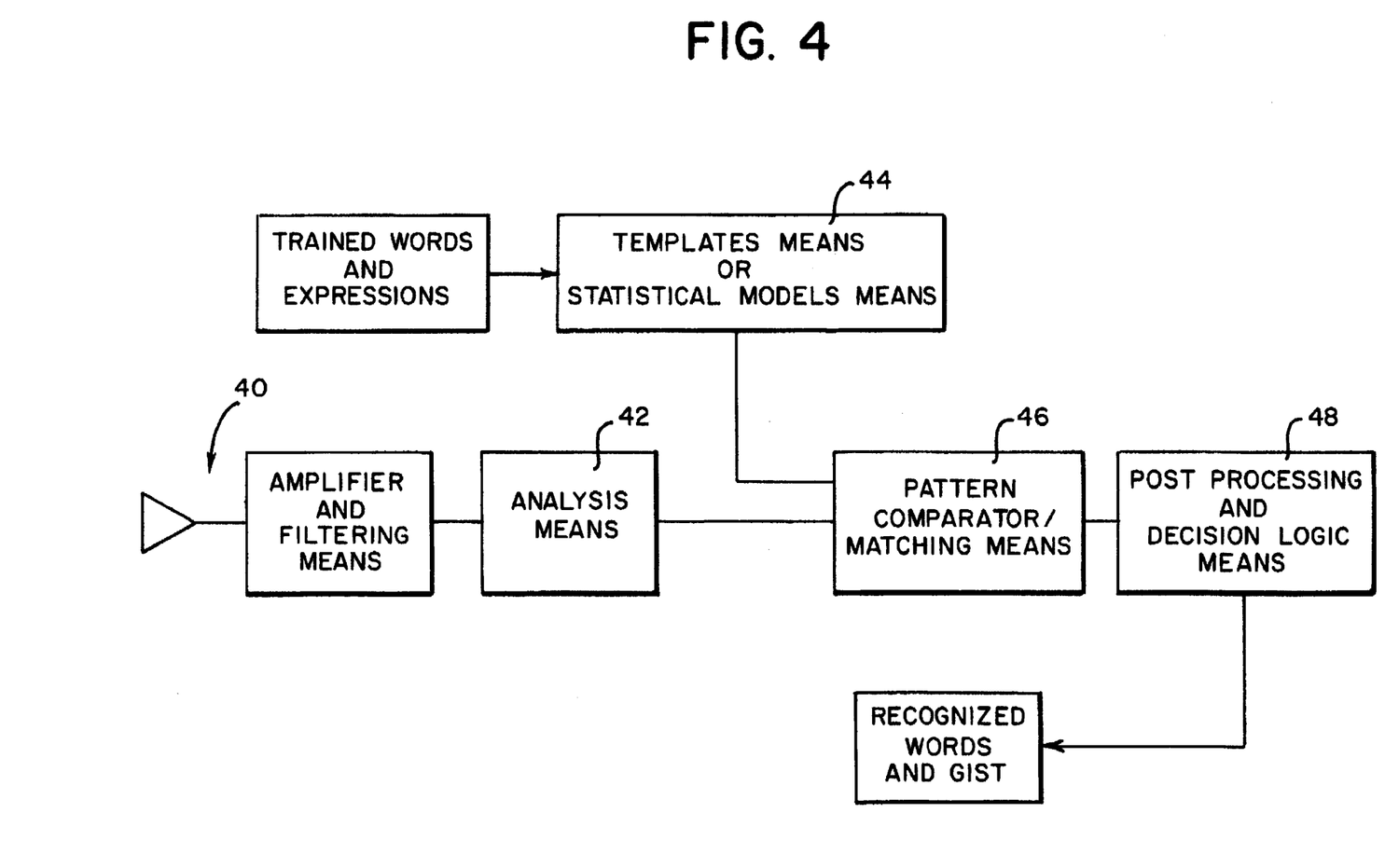
FIG. 4 is a schematic block diagram of a conventional word recognition system which may be employed in the invention.

Referring to FIG. 4, a conventional automatic word recognition system is shown, including an input microphone system 40, an analysis subsystem 42, a template subsystem 44, a pattern comparator 46, and a post-processor and decision logic subsystem 48.

In operation, upon activation, the acoustic/audio policing system will begin sampling all (or a selected portion) of nearby acoustic signals. The acoustic signals will include voices and background noise. The background noise signals are generally known and predictable, and may therefore be easily filtered out using conventional filtering techniques. Among the expected noise signals are unfamiliar speech, automotive related sounds, honking, sirens, the sound of wind and/or rain.

The microphone input system 40 pick-up the acoustic signals and immediately filter out the predictable background noise signals and amplify the remaining recognizable acoustic signals. The filtered acoustic signals are analyzed in the analysis subsystem 42 which processes the signals by means of digital and spectral analysis techniques. The output of the analysis subsystem is compared in the pattern comparater subsystem 46 with selected predetermined words stored in memory in 44. The post processing and decision logic subsystem 48 generates an alarm signal, as described below.

The templates 44 include perhaps about 100 brief and easily recognizable terse expressions, some of which are single words, and are commonly used by those intent on a criminal act. Some examples of commonly used word phrases spoken by a criminal to a victim prior to a mugging, for example, include: "Give me your money", "This is a stick-up", "Give me your wallet and you won't get hurt".. . etc. Furthermore, commonly used replies from a typical victim during such a mugging may also be stored as template words, such as "help", and certain sounds such as shrieks, screams and groans, etc.

The specific word templates, from which inputed acoustic sounds are compared with, must be chosen carefully, taking into account the particular accents and slang of the language spoken in the region of concern. Hence, a statistical averaging of the spectral content of each word must be used.

The output of the word recognition system shown in FIG. 4 is used as a trigger signal to activate a sound recorder, or a camera used elsewhere in the invention, as described below.

The preferred microphone used in the microphone input subsystem 40 is a shot-gun microphone, such as those commercially available from the Sennheiser Company of Frankfurt, Germany. These microphone have a super-cardioid propagation pattern. However, the gain of the pattern may be too small for high traffic areas and may therefore require more than one microphone in an array configuration to adequately focus and track in these areas. The propagation pattern of the microphone system enables better focusing on a moving sound source (e.g., a person walking and talking). A conventional directional microphone may also be used in place of a shot-gun type microphone, such as those made by the Sony Corporation of Tokyo, Japan. Such directional microphones will achieve similar gain to the shot-gun type microphones, but with a smaller physical structure.

A feedback loop circuit (not specifically shown) originating in the post processing subsystem 48 will direct the microphone system to track a particular dynamic source of sound within the area surveyed by video cameras.

An override signal from the video portion of the present invention will activate and direct the microphone system towards the direction of the field of view of the camera. In other words, should the video system detect a potential crime in progress, the video system will control the audio recording system towards the scene of interest. Likewise, should the audio system detect words of an aggressive nature, as described above, the audio system will direct appropriate video cameras to visually cover and record the apparent source of the sound.

A number of companies have developed very accurate and efficient, speaker independent word recognition systems based on a hidden Markov model (HMM) in combination with an artificial neural network (ANN). These companies include IBM of Armonk, N.Y., AT&T Bell Laboratories, Kurtzwell of Cambridge, Mass. and Lernout and Hauspie of Belgium.

Put briefly, the HMM applies probabilistic statistical procedure in recognizing words. In the training steps, an estimate is made of the means and covariance of the probabilistic model of each word, e.g., those words which are considered likely to be uttered in an interaction. The various ways which any given word is pronounced, permits the spectral parameters of the word to be an effective describer of the model. The steps involved in recognizing an input of an unknown word consists of computing the likelihood that the word was generated by each of the models developed during the training. The word is considered as "recognized" when its model gives the highest score. Finally, since the words are composed of word units, the evaluation of conditional probabilities of one particular unit followed by the same or another word unit is also part of the computation.

The resulting list of potential words is considerably shorter than the entire list of all spoken words of the English language. Therefore, the HMM system employed with the present invention allows both the audio and video systems to operate quickly and use HMM probability statistics to predict future movements or words based on an early recognition of initial movements and word stems.

The HMM system may be equally employed in the video recognition system. For example, if a person's arm quickly moves above his head, the HMM system may determine that there is a high probability that the arm will quickly come down, perhaps indicating a criminal intent.

While certain embodiments of the invention have been described for illustrative purposes, it is to be understood that there may be various other modifications and embodiments within the scope of the invention as defined by the following claims.

What is claimed:

1. A surveillance system, comprising:

a) a video camera for translating real images of an area into electronic video signals;

b) means for sampling movements of an individual located within the area from said electronic video signals of said video camera;

c) means for electronically comparing said sampled movements with predetermined characteristics of movements;

d) means for predicting future movements of said individual based on said electronic comparing means of said sampled movements; and e) means for generating a signal responsive to predetermined predicted future movements.

2. The surveillance system in accordance with claim 1, wherein said signal generating means activates a video signal recorder for recording said video signals from said camera.

3. The surveillance system in accordance with claim 1, wherein said signal generating means activates a microphone for receiving audible information of said individual located in said area.

4. The surveillance system in accordance with claim 1, wherein said signal generating means activates at least one high resolution camera.

* * * * *